United States Patent [19]

Zupancic

[11] 4,429,122

[45] Jan. 31, 1984

[54] SEPARATION OF SACCHARIDES

[75] Inventor: Joseph J. Zupancic, Bensenville, Ill.

[73] Assignee: UOP Inc., Des Plaines, Ill.

[21] Appl. No.: 369,995

[22] Filed: Apr. 20, 1982

[51] Int. Cl.³ .............................................. C07H 1/06
[52] U.S. Cl. .................................... 536/124; 536/1.1; 536/127
[58] Field of Search ......................... 536/1.1, 124, 127

[56] References Cited

U.S. PATENT DOCUMENTS 3,864,166  2/1975  Barker et al. ........................ 536/127

OTHER PUBLICATIONS

Pigman, *The Carbohydrates,* 1957, p. 647.

*Primary Examiner*—Johnnie R. Brown
*Assistant Examiner*—Elli Peseler

*Attorney, Agent, or Firm*—James R. Hoatson, Jr.; Raymond H. Nelson; William H. Page, II

[57]  ABSTRACT

The separation of mono- or disaccharides such as glucose or maltose from polysaccharides such as starch may be effected by passing a mixture of these saccharides through an ultra-filtration membrane whereby the glucose or maltose is separated from the starch. The ultra-filtration membranes which are employed for this purpose will comprise a cross-linked polyurethane composited on a support. As an example of the type of membrane which may be employed, an amine-modified polyepihalohydrin such as epichlorohydrin which has been cross-linked with toluene diisocyanate is composited on a polysulfone. This type of ultra-filtration membrane will permit the use of a relatively high flux with a good separation efficiency.

15 Claims, No Drawings

SEPARATION OF SACCHARIDES

BACKGROUND OF THE INVENTION

In many commercial enterprises, sugar is utilized to a great extent for its sweetening properties. It is used in the sweetening of foods, for the manufacture of syrups and confectionery items, in preserves and jams, as a chemical intermediate for detergents, emulsifying agent and other sucrose derivatives such as plasticizers, resins, glues, etc. The usual derivation of sugar is from cane sugar and sugar beets. It is obtained by crushing and extracting the sugar from the cane with water or extracting the sugar from the sugar beet with water followed by evaporation and purifying with lime, absorbent carbon and/or various liquids. The chief component of this type of sugar is sucrose, while other sugars may contain other polysaccharides such as dextrose and levulose (fructose). Other polysaccharides which possess sweetening properties include glucose, maltose, etc. The various polysaccharides possess varying degrees of sweetness, especially when in pure form and not contaminated by any reversion products.

One source of glucose which possesses a relatively high degree of sweetness and which, in turn, may be converted to fructose, the latter possessing an even greater degree of sweetness, is a starch. As is well known, starch is present in many naturally-occurring plants including corn, potatoes, rice, tapioca, wheat, etc. Heretofore, it has been known to treat starch with an enzyme such as amyloglucosidase to obtain glucose. However, the treatment heretofore provided entailed a relatively long residence time in order to obtain a glucose syrup which contained about 94% glucose. The relatively long residence time which has heretofore been required restricts the throughput of glucose and results in the appearance of reversion products which impart a bitter taste to the glucose, thus negating the sweetening property of the compound as well as requiring further treatment in order to remove the offering product. One such reversion product which imparts a bitter taste comprises isomaltose.

In addition to the reversion products which are formed during the reaction period, some of the polysaccharide remains unconverted. In order to obtain the desired mono- or disaccharide in a relatively pure form, it is necessary to separate these unconverted polysaccharides from the desired reaction product. In addition, if a free enzyme has been used to effect the desired conversion, it must also be separated from the reaction product. As will hereinafter be shown in greater detail, it has now been found that the desired separation process may be effected by separating the reaction mixture comprising monosaccharides, disaccharides, unconverted polysaccharides, and, in some instances, enzyme over an ultra-filtration membrane at a relatively high separation efficiency whereby a purification of the desired sugars is effected.

BRIEF SUMMARY OF THE INVENTION

This invention relates to a process for the separation of mono- or disaccharides from polysaccharides. More specifically, the invention is concerned with the separation of a mono- or disaccharide from unreacted polysaccharides and, in some instances, conversion agents such as enzymes in which the ultra-filtration membrane employed in the separation will possess a high separation efficiency while effecting the separation reaction at a relatively high flux.

Syrups which are high in glucose or maltose concentration comprise desirable chemical entities. By utilizing these syrups which are high in glucose or maltose content for sweetening processes such as in baking goods, candies or in the case of maltose, in culture media or even as a sweetener or nutrient, it is possible to utilize lesser amounts of these syrups, thereby concomitantly reducing the overall cost of the finished product.

It is therefore an object of this invention to provide a separation process utilizing an ultra-filtration membrane capable of effecting the separation of mono- or disaccharides from polysaccharides.

A further object of this invention is to provide a separation process utilizing a cross-linked polyurethane ultra-filtration membrane which is capable of purifying mono- or disaccharide in a separation process while employing a relatively high flux with a concurrent high separation efficiency.

In one aspect, an embodiment of this invention resides in a process for the separation of a mono- or disaccharide from polysaccharides which comprises passing a mixture of monosaccharide, disaccharide, and polysaccharides over an ultra-filtration membrane comprising a cross-linked polyurethane composited on a support at ultra-filtration conditions, and recovering the mono- or disaccharide.

A specific embodiment of this invention is found in a process for the separation of a mono- or disaccharide from polysaccharides which comprises passing a mixture of glucose or maltose and starch over an ultra-filtration membrane comprising an amine-modified epichlorohydrin composited on polysulfone at a temperature in the range of from about ambient to about 70° C. and a pressure in the range of from about 20 to about 1000 pounds per square inch (psi), and recovering the glucose or maltose.

Other objects and embodiments will be found in the following further detail description of the present invention.

DETAILED DESCRIPTION OF THE INVENTION

As hereinbefore set forth, the present invention is concerned with the separation of mono- and disaccharide from polysaccharides and particularly to an ultra-filtration membrane which is useful therefore. The ultra-filtration membrane which is useful for this purpose comprises a polymeric composition which may be genetically referred to as either a polyurethane or polyamide composited on a support. The supports which may be employed will comprise various polymeric compositions such as, but not limited to, polysulfones, polyesters, polycarbonates, polyolefins such as polyethylene, polypropylene, polyvinyl chloride, etc. The ultra-filtration membrane which is composited on the aforesaid support will, as hereinbefore set forth, comprise a cross-linked polyurethane or polyamide which is prepared by cross-linking a polyamine with a cross-linking agent. Examples of polyamine compounds which may be cross-linked will include amine-modified polyepihalohydrins such as epichlorohydrin, epibromohydrin, 1,2-epoxy-4-chlorobutane, 2,3-epoxy-4-chlorobutane, 1,2-epoxy-5-chloropentane, 2,3-epoxy-5-chloropentane, 1,2-epoxy-4-bromobutane, 2,3-epoxy-4-bromobutane, 1,2-epoxy-5-bromopentane, 2,3-epoxy-5-bromopentane, etc., polyethyleneimine, polyvinylamine, diethylenetriamine, dipropylenetriamine, triethylenetetramine, tripropyltetramine, tributyltetramine, etc., tetraethylenepentamine, pentaethylenehexamine, etc.

The aforementioned polyamines are then cross-linked by treatment with a polyfunctional agent which is capable of reacting with the amine group of the polyamine. The cross-linking agent which may be employed to react with the amine may comprise di- and tribasic acid chlorides, both saturated and unsaturated in nature in which the carbon chain may range from about 1 to about 20 carbon atoms, acid anhydrides in which the carbon chain of the carboxylic acid will contain from about 1 to about 20 carbon atoms, aliphatic and aromatic diisocyanates, thioisocyanates, chloroformates and sulfonyl chlorides. Some specific examples of these cross-linking agents will include the acid chlorides such as oxalyl chloride, malonyl chloride, succinyl chloride, glutaryl chloride, fumaryl chloride, glutaconyl chloride, phthaloyl chloride, isophthaloyl chloride, terephthaloyl chloride, trimellitoyl chloride, mesitoyl chloride, etc., acid anhydrides such as phthalic anhydride, succinic anhydride, etc., ethylene diisocyanate, propylene diisocyanate, benzene diisocyanate, toluene diisocyanate, naphthalene diisocyanate, methylene bis(4-phenylisocyanate), benzene bis(thioisocyanate), toluene bis(thioisocyanate), naphthalene bis(thioisocyanate), etc., ethylene bischloroformate, propylene bischloroformate, butylene bischloroformate, etc., 1,3-benzenedisulfonyl chloride, 1,4-benzenedisulfonyl chloride, 1,3-naphthalenedisulfonyl chloride, 1,4-naphthalenedisulfonyl chloride, etc.

In one embodiment, the ultra-filtration membranes which are used in the process of this invention may be prepared by coating a support of the type hereinbefore set forth with an aqueous solution of the polyamine. The polyamine will be present in the aqueous solution in an amount in the range of from about 0.4% to about 1.2% by weight. After coating the support with the polyamine, the excess solution is drained and the coated support is allowed to stand for a period in the range of about 0.1 to about 5 minutes. Following this, the cross-linking agent in an organic solvent such as hexane, heptane, cyclohexane, methylcyclopentane, benzene, toluene, etc. is then added to the coated support to effect the desired cross-linkage. The cross-linking agent will be present in the organic solvent in an amount in the range of from about 0.15% to about 0.5% by weight. After allowing the coated support to remain in the cross-linking solution for a period ranging from about 0.1 to about 5 minutes, the organic solution containing the cross-linking agent is drained off from the support, the support is then washed with a hydrocarbon solvent such as those enumerated above, drained and prepared for use. The preparation of the ultra-filtration membrane is preferably effected at ambient temperature and atmospheric pressure.

It is also contemplated that the membrane which is used in the present invention may be prepared in a continuous manner. When such a type of operation is employed, a support of the type hereinbefore set forh is continuously passed through an aqueous bath of the polyamine for a predetermined period of time and is continuously withdrawn. The coated support is then continuously passed through an organic bath containing the cross-linking agent, again for a predetermined period of time whereby the polyamine is cross-linked to form the desired ultra-filtration membrane. After passage through the organic solution containing the cross-linking agent, the membrane system is continuously withdrawn and may, if so desired, be washed with a hydrocarbon solvent to remove any excess cross-linking agent and/or unreacted polyamine.

While, as heretofore set forth, the preparation of the ultra-filtration membrane system is preferably effected at ambient temperature and atmospheric pressure, it is also contemplated that the membrane system, after preparation, may be subjected to an annealing or heat-curing step in which the membrane system is subjected to an elevated temperature which may range from about 60° to about 100° C. for a predetermined period which may range from about 1 to about 4 hours. As will hereinafter be shown in greater detail in the examples at the end of the specification, this treatment will not affect the activity or separation efficiency of the membrane when used in the separation of mono- and disaccharides from polysaccharides.

The process of this invention may be effected in any suitable manner and may comprise either a batch or continuous type operation. For example, when a batch type operation is employed, the feedstock which comprises the reaction mixture resulting from the treatment of a polysaccharide with an appropriate enzyme such as alpha-amylase, beta-amylase, amyloglucosidase, and other alpha-glucosidases, cellulase, etc. and which contains monosaccharides, disaccharides, undigested polysaccharides, and, in some instances, the enzyme itself, in the event that a soluble enzyme has been used, is placed in an appropriate apparatus such as a cell which contains the membrane at the bottom thereof. The apparatus is then pressurized to a predetermined operating pressure which may be in the range of from about 10 to about 2000 psi or more to force the permeate through the ultra-filtration membrane. In addition, the apparatus is also maintained at a predetermined operating temperature which may vary over a relatively wide range, i.e., from subambient (about 5° C.) up to about 80° C. or more. The permeate which comprises a mono- or disaccharide is recovered, while the retentate may also be collected for further treatment with additional enzyme in order to convert the remaining polysaccharide to the desired mono- or disaccharide, or further hydrolysis.

It is also contemplated within the scope of this invention that the process may be effected in a continuous manner of operation. When such a type of operation is employed, the feedstock which is similar to that hereinbefore described is continuously charged to an apparatus which is provided with an ultra-filtration membrane of the type hereinbefore set forth. The desired apparatus is maintained at predetermined operating conditions of temperature and pressure. After passage through the membrane, the permeate, which contains the monosaccharide or disaccharide such as glucose or maltose, is continuously recovered and passed to storage, while the retentate may also be recovered and recycled back to a conversion zone for further treatment to prepare more of the desired product.

The following examples are given for purposes of illustrating the process of the present invention. However, it is to be understood that these examples are given merely for purposes of illustration and that the present invention is not necessarily limited thereto.

EXAMPLE I

In this example, a membrane system was prepared by coating a polysulfone support with an aqueous solution containing 0.60% of amine-modified polyepichlorohydrin at ambient temperature and atmospheric pressure. The solution was allowed to remain on the support for a period of 1.0 minute following which the excess solution was drained. Thereafter, the coated polysulfone support was treated with a 0.25 wt. % toluene diisocyanate dissolved in an organic solvent comprising n-heptane. After allowing the coated polysulfone support to be treated with this organic solution for a period of 1.0 minute, the excess solution was drained, the composite membrane was washed with n-heptane and air-dried for a period of 5.0 minutes.

The composite membrane prepared according to the above paragraph was then placed at the bottom of a cell measuring 43 mm × 100 mm. Following this, 50 ml of a glucose solution possessing 30% dissolved solids and containing 17.8% of $DP_{9+}$, 0.2% $DP_3$, 3.0% $DP_2$ and 79.0% of glucose was placed in the cell. The cell was pressured to about 50 psi and the flux rate of the permeate which passed through the membrane was measured. this test including the constituency of the feed, the permeate and the retentate are set forth in Table I below:

TABLE I

|  | $DP_{9+}$ | $DP_8$ | $DP_7$ | $DP_6$ | $DP_5$ | $DP_4$ | $DP_3$ | $DP_2$ | $DP_1$ |
|---|---|---|---|---|---|---|---|---|---|
| Maltose Feed | 26.3 | 1.2 | 0.6 | 0.3 | 0.1 | 0.5 | 11.8 | 59.2 | d |
| Permeate | 1.2 | 0.4 | — | — | — | — | 14.2 | 84.2 | d |
| Retentate | 33.8 | 1.7 | 0.5 | 0.4 | 0.2 | 0.4 | 11.0 | 52.0 | d |

EXAMPLE III

To illustrate the ability of a composite membrane comprising a cross-linked polyurethane composited on a support to effectively separate mono- and disaccharides from polysaccharides, another experiment was performed in which a glucose feedstock and a maltose feedstock, each containing 30% dissolved solids, were passed through an ultra-filtration membrane comprising only the support, in this case polysulfone. The apparatus which was used was identical to that set forth in Examples I and II above, the glucose and maltose feed being passed through the polysulfone membrane at a pressure of 20 psi. In the case of the glucose feed, the flux rate was $5.2 \times 10^{-3}$ ml/min/cm$^2$, while the flux rate of the maltose feed was $2.7 \times 10^{-3}$ ml/min/cm$^2$. The results of these experiments are set forth in Table II below:

TABLE II

|  | $DP_{9+}$ | $DP_8$ | $DP_7$ | $DP_6$ | $DP_5$ | $DP_4$ | $DP_3$ | $DP_2$ | $DP_1$ |
|---|---|---|---|---|---|---|---|---|---|
| Glucose Feed | 17.7 | — | — | — | — | — | 0.3 | 3.0 | 79.0 |
| Permeate | 10.4 | — | — | — | — | — | 0.4 | 3.3 | 85.9 |
| Retentate | 23.6 | Tr. | 0.1 | — | — | — | 0.3 | 2.8 | 73.2 |
| Maltose Feed | 32.9 | — | — | — | — | 0.6 | 10.9 | 51.0 | 4.6 |
| Permeate | 19.6 | — | — | — | — | 0.5 | 13.5 | 65.0 | 1.4 |
| Retentate | 42.2 | — | — | 0.1 | — | 0.4 | 9.8 | 46.7 | 0.8 |

The flux rate of this test was $9.1 \times 10^3$ ml/min/cm$^2$. Both the permeate and retentate were analyzed and it was found that the permeate contained only 0.4% of $DP_{9+}$, 0.3% of $DP_3$, 3.2% of $DP_2$ and 96.1% of glucose. In addition, the retentate was found to contain 32.4% of $DP_{9+}$, 0.4% of $DP_3$, 2.8% of $DP_2$, 62.2% glucose and 0.1% each of $DP_7$, $DP_6$, $DP_5$ and $DP_4$.

EXAMPLE II

In this example, a membrane which was prepared according to the method set forth in Example I above was placed in the bottom of a cell and 50 ml of a maltose feed solution containing 30% dissolved solids was then added to the cell. The cell was pressurized to about 70 psi and the permeate which was forced through the membrane was measured for flux rate, said flux rate being $5.7 \times 10^{-3}$ ml/min/cm$^2$. Both the permeate and retentate were collected and analyzed. The results of

EXAMPLE IV

To illustrate the differences in separation efficiency and flow rates of various ultra-filtration membranes comprising a cross-linked epiamine, a series of experiments were performed in which 9 membranes were prepared in a manner similar to that set forth in Example I above. A polysulfone support was treated with an aqueous solution of the amine-modified epichlorohydrin, the amount of epiamine in the solution varying from 0.4% to 1.20%. After coating the polysulfone with these solutions, the excess solution was drained and the coated polysulfone treated with a solution of toluene diisocyanate dissolved in n-heptane, the amount of toluene diisocyanate varying from 0.16% to 0.50%. After washing the membrane with n-heptane, the membranes were then air-dried and used in a sugar separation process at ambient temperature and pressures ranging from about 20 to about 90 psi. The results of these tests are set forth in Table III below:

TABLE III

|  | $DP_{9+}$ | $DP_8$ | $DP_7$ | $DP_6$ | $DP_5$ | $DP_4$ | $DP_3$ | $DP_2$ | $DP_1$ |
|---|---|---|---|---|---|---|---|---|---|
| (0.60% epiamine, 0.25% toluene diisocyanate) | | | | | | | | | |
| Glucose Feed | 19.2 | — | — | — | 0.1 | 0.1 | 0.3 | 3.2 | 77.1 |
| Permeate | 0.5 | — | — | — | — | — | 0.4 | 3.6 | 95.5 |
| Retentate | 29.5 | — | — | — | — | 0.1 | 0.2 | 2.7 | 67.8 |
| Maltose Feed | 29.3 | 0.7 | 0.5 | 0.3 | 0.2 | 0.4 | 11.5 | 57.1 | a |
| Permeate | 1.5 | — | — | — | — | 0.5 | 15.5 | 82.5 | a |
| Retentate | 43.2 | 1.0 | 0.6 | 0.4 | 0.2 | 0.4 | 9.7 | 44.5 | a |
| (0.75% epiamine, 0.25% toluene diisocyanate) | | | | | | | | | |
| Glucose Feed | 19.1 | — | — | — | — | — | 0.3 | 3.1 | 77.5 |
| Permeate (70 psi) | 0.1 | — | — | — | — | — | 0.4 | 3.3 | 96.2 |
| Permeate (50 psi) | 0.1 | — | — | — | — | — | 0.3 | 4.0 | 95.6 |
| Retentate | 44.2 | 0.4 | 0.4 | 0.7 | 0.3 | 0.3 | 0.5 | 2.5 | 50.7 |

TABLE III-continued

|  | DP$_{9+}$ | DP$_8$ | DP$_7$ | DP$_6$ | DP$_5$ | DP$_4$ | DP$_3$ | DP$_2$ | DP$_1$ |
|---|---|---|---|---|---|---|---|---|---|
| Maltose Feed | 28.0 | 1.3 | 0.6 | 0.4 | 0.2 | 0.5 | 11.6 | 57.4 | a |
| Permeate | 0.2 | — | — | — | — | — | 14.6 | 85.2 | a |
| Retentate | 43.3 | 0.7 | 0.4 | 0.3 | 0.2 | 0.7 | 10.4 | 44.0 | a |
| (0.90% epiamine, 0.25% toluene diisocyanate) | | | | | | | | | |
| Glucose Feed | 18.9 | — | — | — | — | 0.1 | 0.4 | 3.2 | 77.4 |
| Permeate | 1.5 | — | — | — | — | 0.1 | 0.5 | 3.7 | 94.2 |
| Retentate | 36.3 | — | — | — | 0.1 | 0.2 | 0.3 | 2.5 | 60.6 |
| Maltose Feed | 26.1 | 1.3 | 0.4 | 0.3 | 0.1 | 0.5 | 12.0 | 59.3 | a |
| Permeate | 7.8 | 1.1 | 0.5 | 0.4 | 0.3 | 0.5 | 14.5 | 74.9 | a |
| Retentate | 40.6 | 0.4 | 0.4 | 0.3 | 0.2 | 0.4 | 10.1 | 47.6 | a |
| (1.20% epiamine, 0.25% toluene diisocyanate) | | | | | | | | | |
| Glucose Feed | 19.1 | — | — | — | — | — | 0.4 | 3.2 | 77.3 |
| Permeate | 1.6 | — | — | — | — | 0.1 | 0.4 | 3.7 | 94.2 |
| Retentate | 31.0 | — | — | — | — | 0.1 | 0.3 | 2.7 | 65.9 |
| Maltose Feed | 26.2 | — | — | 1.2 | 0.3 | 0.2 | 12.3 | 59.8 | a |
| Permeate | 6.4 | 1.7 | 1.0 | 0.4 | 0.2 | 0.5 | 14.7 | 75.1 | a |
| Retentate | 40.0 | 1.4 | 0.4 | 0.3 | 0.1 | 0.3 | 9.9 | 47.6 | a |
| (0.60% epiamine, 0.50% toluene diisocyanate) | | | | | | | | | |
| Glucose Feed | 18.7 | — | — | — | — | 0.1 | 0.3 | 3.3 | 77.6 |
| Permeate | 1.6 | — | — | — | — | — | 0.4 | 3.7 | 94.3 |
| Retentate | 30.1 | — | — | — | — | — | 0.3 | 2.9 | 66.7 |
| Maltose Feed | 29.3 | 0.8 | 0.5 | 0.3 | 0.1 | 0.5 | 11.4 | 59.1 | a |
| Permeate | 4.0 | — | 1.2 | 0.5 | 0.5 | 0.6 | 14.8 | 78.4 | a |
| Retentate | 43.6 | 0.9 | 0.5 | 0.3 | 0.2 | 0.4 | 9.4 | 44.6 | a |
| (0.75% epiamine, 0.25% toluene diisocyanate) | | | | | | | | | |
| Glucose Feed | 19.1 | — | — | — | — | — | 0.3 | 3.1 | 77.5 |
| Permeate (50 psi) | 1.5 | — | — | — | — | — | 0.2 | 2.8 | 95.5 |
| Permeate (90 psi) | 0.9 | — | — | — | — | — | — | 2.3 | 96.8 |
| Retentate | 28.3 | — | — | — | — | — | 0.3 | 3.3 | 68.1 |
| Maltose Feed | 27.9 | — | — | — | — | — | 12.7 | 59.4 | a |
| Permeate | 6.2 | — | — | — | — | — | 13.0 | 80.8 | a |
| Retentate | 31.9 | — | — | — | — | — | 12.8 | 55.3 | a |
| (0.75% epiamine, 0.50% toluene diisocyanate) | | | | | | | | | |
| Glucose Feed | 19.3 | — | — | — | — | 0.1 | 0.3 | 3.1 | 77.2 |
| Permeate | 3.1 | — | — | — | — | — | 0.3 | 3.5 | 93.1 |
| Retentate | 30.0 | — | Tr | 0.1 | 0.1 | 0.1 | 0.4 | 2.8 | 66.5 |
| Maltose Feed | 27.4 | 0.4 | 0.4 | 0.2 | 0.1 | 0.5 | 12.0 | 59.0 | a |
| Permeate | 9.1 | — | — | 0.2 | 0.1 | 0.5 | 14.3 | 75.8 | a |
| Retentate | 41.2 | 0.6 | 0.5 | 0.3 | 0.1 | 0.5 | 10.3 | 46.5 | a |
| (1.20% epiamine, 0.16% toluene diisocyanate) | | | | | | | | | |
| Glucose Feed | 19.0 | — | — | — | 0.1 | 0.1 | 0.4 | 3.2 | 77.2 |
| Permeate | 3.9 | — | — | — | — | — | 0.4 | 3.8 | 91.9 |
| Retentate | 33.8 | — | — | 0.1 | 0.1 | 0.1 | 0.4 | 2.7 | 62.8 |
| Maltose Feed | 29.1 | 0.8 | 0.2 | 0.2 | 0.1 | 0.5 | 11.6 | 57.5 | a |
| Permeate | 8.8 | — | — | 0.7 | 0.2 | 0.5 | 14.2 | 75.6 | a |
| Retentate | 38.2 | 0.9 | 0.5 | 0.3 | 0.2 | 0.4 | 10.4 | 49.1 | a |
| (0.40% epiamine, 0.16% toluene diisocyanate) | | | | | | | | | |
| Glucose Feed | 18.2 | — | — | — | — | — | 0.5 | 3.9 | 77.4 |
| Permeate | 7.8 | — | — | — | Tr | 0.2 | 0.3 | 3.2 | 88.5 |
| Retentate | 27.1 | — | — | — | — | 0.1 | 0.3 | 3.0 | 69.5 |
| Maltose Feed | 34.0 | — | — | — | — | 0.5 | 10.9 | 51.4 | 3.2 |
| Permeate | 17.0 | — | — | — | — | 0.6 | 13.6 | 65.2 | 3.6 |
| Retentate | 36.6 | 0.1 | — | — | 0.1 | 0.6 | 10.6 | 49.7 | 2.3 |

$^a$Included in DP$_2$

It is noted from the results set forth in the above table that the composite membrane prepared from 0.75 epiamine and 0.25% toluene diisocyanate shows the highest selectivity, while the membrane prepared from 0.6% epiamine and 0.25% toluene diisocyanate showed the highest flux rate coupled with good selectivity. It is to be noted that flux rates which are acceptable in this type of separation are those which are in excess of $3 \times 10^{-3}$ ml/min/cm$^2$ at ambient temperature and operating pressure of 50 psi.

EXAMPLE V

To illustrate the possibility of subjecting the membrane to a heat-curing step while retaining the activity and efficiency of the membrane, a series of experiments were carried out in which, in the first case, a polysulfone support was subjected to a temperature of 80° C. for a period of 2 hours. In the other experiments, a membrane system was prepared by coating the polysulfone support with an aqueous solution containing varying amounts of amine-modified polyepichlorohydrin at ambient temperature and atmospheric pressure. Following the coating, excess solution was drained and the coated polysulfone support was treated with an organic solution containing varying amounts of toluene diisocyanate. The composite membrane was washed with n-heptane, air-dried, and annealed at a temperature of 80° C. for a period of 2 hours.

The composite membrane was then utilized as an ultra-filtration membrane for the separation of glucose from a solution containing glucose and polysaccharides. The separation was effected in a manner similar to that set forth in Example I above in which 50 ml of the glucose solution containing 30% by weight of dissolved solids was passed through the membrane. The results of these experiments are set forth in Table IV below:

TABLE IV

| | DP$_{9+}$ | DP$_8$ | DP$_7$ | DP$_6$ | DP$_5$ | DP$_4$ | DP$_3$ | DP$_2$ | DP$_1$ |
|---|---|---|---|---|---|---|---|---|---|
| (Annealed Polysulfone Membrane)[a] | | | | | | | | | |
| Glucose Feed | 18.7 | — | — | — | — | — | 0.2 | 3.1 | 78.0 |
| Permeate | 14.8 | — | — | — | — | — | 0.4 | 3.3 | 81.5 |
| Retentate | 27.2 | 0.3 | 0.1 | — | — | 0.1 | 0.4 | 3.0 | 68.9 |
| Maltose Feed | 30.2 | 0.5 | 0.4 | 0.3 | 0.3 | 0.6 | 11.9 | 55.8 | [b] |
| Permeate | 18.3 | — | — | — | 0.1 | 0.4 | 13.6 | 67.6 | [b] |
| Retentate | 41.0 | 0.5 | 0.4 | 0.3 | 0.1 | 0.6 | 10.2 | 46.1 | [b] |
| (0.60% Epiamine, 0.50% Toluenediisocyanate) | | | | | | | | | |
| Glucose Feed | 19.2 | Tr | Tr | — | 0.1 | — | 0.3 | 3.2 | 77.2 |
| Permeate | 0.3 | — | — | — | — | — | 0.2 | 3.4 | 96.1 |
| Retentate | 36.6 | — | — | — | — | 0.1 | 0.4 | 2.7 | 60.2 |
| Maltose Feed | 29.9 | 0.3 | 0.3 | 0.2 | 0.2 | 0.6 | 12.0 | 56.5 | [b] |
| Permeate | 1.0 | — | — | — | — | 0.4 | 15.4 | 83.2 | [b] |
| Retentate | 41.2 | 0.5 | 0.4 | 0.1 | — | 0.5 | 10.5 | 46.8 | [b] |
| (0.75% Epiamine, 0.25% Toluenediisocyanate) | | | | | | | | | |
| Glucose Feed | 18.9 | — | — | — | — | — | 0.4 | 3.2 | 77.5 |
| Permeate | 0.2 | — | — | — | — | — | 0.3 | 3.3 | 96.2 |
| Retentate | 31.7 | 0.6 | 0.3 | 0.3 | 0.3 | 0.2 | 0.6 | 3.1 | 62.9 |
| Maltose Feed | 29.3 | 0.9 | 0.4 | 0.3 | 0.1 | 0.4 | 11.8 | 56.8 | [b] |
| Permeate | 6.9 | — | — | 0.1 | — | — | 14.4 | 78.6 | [b] |
| Retentate | 40.3 | 0.7 | 0.4 | 0.2 | 0.1 | 0.5 | 11.0 | 46.8 | [b] |

[a]DP—s are based on % area for each component in sample.
[b]Included in DP$_2$

EXAMPLE V

To illustrate the fact that the separation efficiency of mono- and disaccharides from polysaccharides is not affected by the percent of dissolved solids in the feed, a series of experiments were performed in which the feed to the ultra-filtration membrane contained varying amounts of dissolved solids, said dissolved solids varying from 1.5% to 30%. The ultra-filtration membrane which was utilized for the separation was similar in nature to the system described in Example I above. The results of these experiments are set forth in Table 5 below:

TABLE V[a]

| | (0.60% Epiamine, 0.25% Toluenediisocyanate)[b] | | | | | | | | |
|---|---|---|---|---|---|---|---|---|---|
| | DP$_{9+}$ | DP$_8$ | DP$_7$ | DP$_6$ | DP$_5$ | DP$_4$ | DP$_3$ | DP$_2$ | DP$_1$ |
| Glucose Feed (1.5% dissolved solids) | 19.1 | — | — | — | — | 0.1 | 0.3 | 3.2 | 77.3 |
| Permeate | 0.1 | — | — | — | — | — | 0.3 | 3.4 | 96.2 |
| Retentate | 35.9 | — | 0.7 | 0.3 | 0.5 | 0.2 | 0.6 | 3.2 | 58.6 |
| Glucose Feed (3% dissolved solid) | 19.0 | — | — | — | — | — | 0.4 | 3.1 | 77.5 |
| Permeate | 0.3 | — | — | 0.4 | — | — | 0.3 | 3.2 | 95.8 |
| Retentate | 33.0 | — | 0.4 | 0.2 | 0.2 | 0.1 | 0.4 | 3.0 | 62.7 |
| Glucose Feed (6% dissolved solids) | 19.0 | — | — | — | 0.2 | — | 0.4 | 3.1 | 77.3 |
| Permeate | 1.3 | — | — | — | — | — | 0.4 | 3.5 | 94.8 |
| Retentate | 34.8 | 0.2 | 0.2 | 0.2 | 0.3 | — | 0.4 | 3.0 | 60.9 |
| Glucose Feed (30.0% dissolved solids) | 18.9 | — | — | — | 0.1 | — | 0.4 | 3.2 | 77.4 |
| Permeate | 0.2 | — | — | — | — | — | 0.3 | 3.5 | 96.0 |
| Retentate | 29.2 | — | — | 0.1 | — | 0.1 | 0.4 | 2.8 | 67.4 |
| Maltose Feed (1.5% dissolved solids) | 23.1 | 1.6 | 1.2 | 0.8 | 0.3 | 1.1 | 18.4 | 49.4 | 4.1 |
| Permeate | 1.0 | 0.1 | — | — | — | 0.7 | 19.1 | 71.3 | 7.8 |
| Retentate | 30.5 | 2.1 | 1.6 | 1.0 | 0.4 | 1.3 | 18.3 | 42.5 | 2.3 |
| Maltose Feed (3.0% dissolved solids) | 23.0 | 1.7 | 1.3 | 0.8 | 0.4 | 1.1 | 18.5 | 49.2 | 4.0 |
| Permeate | 0.7 | 0.1 | — | — | — | 0.6 | 18.7 | 72.3 | 7.6 |
| Retentate | 30.7 | 2.1 | 1.6 | 0.9 | 0.4 | 1.2 | 18.4 | 41.8 | 2.9 |
| Maltose Feed (6.0% dissolved solids) | 22.9 | 1.6 | 1.2 | 0.8 | 0.3 | 1.1 | 18.3 | 49.1 | 4.7 |
| Permeate | 0.7 | 0.1 | — | — | — | 0.6 | 18.8 | 71.7 | 8.1 |
| Retentate | 30.7 | 2.1 | 1.7 | 1.0 | 0.5 | 1.4 | 18.1 | 42.2 | 2.3 |
| Maltose Feed (30.0% dissolved solids) | 23.7 | 1.6 | 1.3 | 0.8 | 0.3 | 1.1 | 18.3 | 49.0 | 3.9 |
| Permeate | 0.7 | 0.2 | 0.3 | 0.2 | 0.1 | 0.8 | 21.8 | 69.7 | 6.2 |
| Retentate | 28.5 | 1.9 | 1.4 | 0.9 | 0.4 | 1.2 | 71.6 | 45.2 | 2.9 |

[a]DP's are based on % area for each component in sample.
[b]Membrane was annealed at 80° C. for 2 hrs.

It is readily apparent from the above examples that an ultra-filtration membrane such as that described which may, if so desired, be subjected to a heat-curing treatment, will operate at a high degree of separation efficiency for the separation of mono- and disaccharides from polysaccharides. The membrane system of the present invention which comprises an amine-modified epihalohydrin cross-linked by a cross-linking agent such as toluene diisocyanate composited on a support such as polysulfone shows a greater percent of efficiency than does the polysulfone support itself.

I claim as my invention:

1. A process for the continuous separation of a mono- or disaccharide from polysaccharides by passing a mixture of monosaccharide, disaccharide and polysaccharides over an ultra-filtration membrane consisting essentially of a polyurethane or a polyamine composited and cross-linked to a support selected from the group consisting of a polysulfone, polyester, polycarbonate and polyolefin support, wherein said cross-linking is provided by a cross-linking agent selected from the group consisting of a dibasic acid chloride, a tribasic acid chloride, an acid anhydride, an aliphatic diisocyanate, an aliphatic thioisocyanate, an aliphatic chloroformate, an aliphatic sulfonyl chloride, an aromatic diisocyanate, an aromatic thioisocyanate, an aromatic chloroformate and an aromatic sulfonyl chloride, said separation being performed at a temperature in the range of from ambient to 70° C. and a pressure in the range of from 20 to 1000 psig to retain said polysaccharides while permitting said monosaccharides or disaccharides to permeate through said ultrafiltration membrane.

2. The process as set forth in claim 1 in which said polyolefin is polyethylene.

3. The process as set forth in claim 1 in which said polyolefin is polypropylene.

4. The process as set forth in claim 1 in which said cross-linked polyurethane or polyamide is prepared by treating an aqueous solution of said polyamine with an organic solution and said cross-linking agent.

5. The process as set forth in claim 4 in which said aqueous solution of said polyamine contains from about 0.4% to about 1.2% by weight of polyamine.

6. The process as set forth in claim 4 in which said organic solution of said cross-linking agent contains from about 0.16 to about 0.5% by weight of cross-linking agent.

7. The process as set forth in claim 1 in which said polyamine comprises an amine-modified polyepihalohydrin.

8. The process as set forth in claim 7 in which said polyepihalohydrin is epichlorohydrin.

9. The process as set forth in claim 1 in which said polyamine comprises polyethyleneimine.

10. The process as set forth in claim 1 in which said polyamine comprises triethylenetetramine.

11. The process as set forth in claim 1 in which said cross-linking agent is toluene diisocyanate.

12. The process as set forth in claim 1 in which said cross-linking agent is isophthaloyl chloride.

13. The process as set forth in claim 1 in which said monosaccharide is glucose.

14. The process as set forth in claim 1 in which said disaccharide is maltose.

15. The process as set forth in claim 1 in which said polysaccharide is starch.

* * * * *